US008516586B1

(12) United States Patent
Jensen et al.

(10) Patent No.: US 8,516,586 B1
(45) Date of Patent: Aug. 20, 2013

(54) CLASSIFICATION OF UNKNOWN COMPUTER NETWORK TRAFFIC

(75) Inventors: Wayne Jensen, Morgan Hill, CA (US); Shaohong Peter Wei, Sunnyvale, CA (US)

(73) Assignee: Trend Micro Incorporated, Tokyo (JP)

( * ) Notice: Subject to any disclaimer, the term of this patent is extended or adjusted under 35 U.S.C. 154(b) by 15 days.

(21) Appl. No.: 13/237,716

(22) Filed: Sep. 20, 2011

(51) Int. Cl.
*H04L 29/06* (2006.01)

(52) U.S. Cl.
USPC ............................................. 726/23; 713/153

(58) Field of Classification Search
None
See application file for complete search history.

(56) References Cited

U.S. PATENT DOCUMENTS

| | | | | |
|---|---|---|---|---|
| 8,180,916 | B1 * | 5/2012 | Nucci et al. | 709/233 |
| 2006/0026676 | A1 * | 2/2006 | O'Donoghue | 726/22 |
| 2009/0031420 | A1 * | 1/2009 | Lloyd et al. | 726/22 |
| 2009/0161544 | A1 * | 6/2009 | Kelly et al. | 370/232 |
| 2010/0031358 | A1 * | 2/2010 | Elovici et al. | 726/24 |
| 2012/0151033 | A1 * | 6/2012 | Baliga et al. | 709/224 |
| 2012/0304244 | A1 * | 11/2012 | Xie et al. | 726/1 |

OTHER PUBLICATIONS

Damiano Bolzoni, et al. "Boosting Web Intrusion Detection Systems by Inferring Positive Signature", pp. 1-19 [retrieved on Apr. 1, 2011], retrieved from the internet: http://doc.utwente.nl/64826/1/bolzoni_etalle_sphinx.pdf, 2008.
SLL Man in the Middle Proxy, 2 sheets [retrieved on Apr. 1, 2011], retrieved from the internet: http://crypto.stanford.edu/ssl-mitm/, Mar. 18, 2008.
Algorithms for Learning Regular Expressions (Extended Abstract), pp. 1-15 [retrieved on Apr. 1, 2011], retrieved from the internet: http://www.informatik.uni-trier.de/~fernau/papers/Fer05c.pdf, 2005.
Anubis: Analyzing Unknown Binaries, 2 sheets [retrieved on Apr. 1, 2011], retrieved from the internet: http://anubis.iseclab.org/, May 10, 2008.
Palo Alto Networks Plunge, 2 sheets [retrieved on Apr. 1, 2011], retrieved from the internet: http://www.jeromiejackson.com/index.php/the-news/92-Plunging-Through-Palo-Alto-Networks-Twitter, Jan. 4, 2011.
Microdasys—Request a personal webinar, 3 sheets [retrieved on Apr. 1, 2011], retrieved from the internet: https://www.microdasys.com/, 2010.
Malware Analysis System, CWSandbox :: Behavior-based Malware Analysis, 1 sheet [retrieved on Apr. 1, 2011], retrieved from the internet: http://mwanalysis.org/, Feb. 10, 2010.
Erik Hjelmvik "The SPID Algorithm—Statistical Protocol IDentification", Oct. 2008, 21 sheets, [retrieved on Apr. 1, 2011], retrieved from the internet: http://www.iis.se/docs/The_SPID_Algorithm_-Statistical_Protocol_IDentification.pdf.

\* cited by examiner

*Primary Examiner* — Gilberto Barron, Jr.
*Assistant Examiner* — Malcolm Cribbs
(74) *Attorney, Agent, or Firm* — Okamoto & Benedicto LLP (57) ABSTRACT

A network application control system is employed to classify unknown computer network traffic. The system includes a firewall computer with a network filter that filters network traffic generated by endpoint computers running local processes. The system may also include a management computer with an endpoint management server that manages endpoint agents running in the endpoint computers. Unknown network traffic is analyzed to generate a pattern matching signature and a policy recommendation. The policy recommendation may be applied to subsequently received network traffic matching the signature.

20 Claims, 8 Drawing Sheets

CLASSIFICATION OF UNKNOWN COMPUTER NETWORK TRAFFIC

BACKGROUND OF THE INVENTION

1. Field of the Invention

The present invention relates generally to computer security, and more particularly but not exclusively to methods and apparatus for classifying computer network traffic.

2. Description of the Background Art

Network application control technologies allow network administrators to visualize and control computer network traffic based on the applications that generate the traffic, rather than merely on source and destination addresses and port numbers. Some computer security vendors provide network application control products that attempt to apply pattern matching to traffic on the wire in order to identify the type of the traffic, and apply logging or policy enforcement based on the type of the traffic as configured by the administrator. Examples of computer security vendors that offer network application control products are firewall vendors (e.g., Palo Alto Networks, Fortinet, and Cisco) and packet shaping vendors (e.g., Bluecoat).

One problem with pattern matching based traffic classification is that a signature must be generated by a person or automated process and then assigned an application identifier or type before traffic of that type can be controlled. Because new network-enabled applications are introduced continuously, there is always some amount of network traffic that cannot be classified. Conventional approaches to this problem involve applying a blanket allow or deny policy to all unclassified network traffic, or generating custom generated signatures based on traditional firewall characteristics pending escalation to the vendor to generate a more accurate signature. For example, custom generated signatures may combine the destination port and protocol (tcp/udp) with a restricted set of traffic (e.g., restricted by source zone, source IP address, destination zone, and destination IP address). Even when such custom generated signatures are sufficient, the network administrator still needs to perform detective work to determine if the traffic really should be allowed or blocked.

SUMMARY

In one embodiment, a method of classifying unknown network traffic in a computer network includes receiving a first set of network traffic generated by a local process running in an endpoint computer in a computer network. The first set of network traffic is detected as an unknown network traffic that has no corresponding signature in a database of traffic matching patterns for identifying network traffic. A signature for the first set of network traffic is generated in response to detecting that the first set of network traffic is an unknown network traffic. A policy recommendation for the first set of network traffic is generated based on an analysis of the first set of network traffic, the policy recommendation indicating whether to allow or block the network traffic. The database of traffic matching patterns is updated to include the signature generated for the network traffic.

In one embodiment, a network application control system in a computer network, includes a plurality of endpoint computers running a plurality of processes. The system further includes a firewall computer configured to filter network traffic generated by the plurality of endpoint computers in the computer network, the firewall computer being configured to receive and detect a first set of network traffic that is not classified to be generated by a particular process running in an endpoint computer in the plurality of endpoint computers. The system further includes a management computer configured to receive the first set of network traffic from the firewall computer for analysis, the management computer being configured to generate a signature for pattern matching the first set of network traffic and a policy recommendation on whether to allow or block other network traffic that matches the signature for pattern matching the first set of network traffic.

In one embodiment, a method of classifying unknown network traffic in a computer network includes detecting that a first set of network traffic transmitted over a computer network is unknown network traffic. A signature for the first set of network traffic is generated. A policy recommendation is generated for the first set of network traffic based on an analysis of the first set of network traffic.

These and other features of the present invention will be readily apparent to persons of ordinary skill in the art upon reading the entirety of this disclosure, which includes the accompanying drawings and claims.

DESCRIPTION OF THE DRAWINGS

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
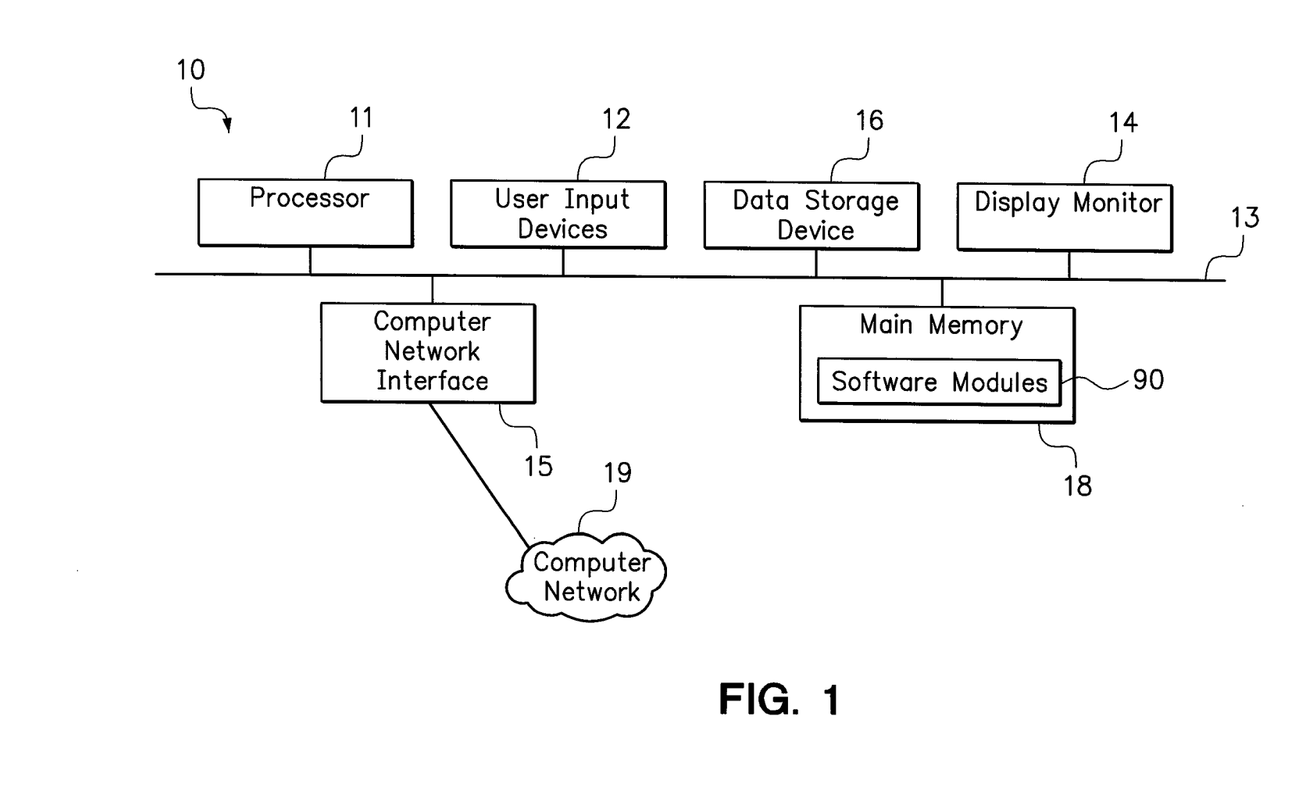
FIG. 1 shows a schematic diagram of a computer in accordance with an embodiment of the present invention.

Referring now to FIG. 1, there is shown a schematic diagram of a computer 10 in accordance with an embodiment of the present invention. The computer 10 may be employed as any of the computers described below. The computer 10 may have fewer or more components to meet the needs of a particular application. The computer 10 may include a processor 11, such as those from the Intel Corporation or Advanced Micro Devices, for example. The computer 10 may have one or more buses 13 coupling its various components. The computer 10 may include one or more user input devices 12 (e.g., keyboard, mouse), one or more data storage devices 16 (e.g., hard drive, optical disk, USB memory), a display monitor 14 (e.g., LCD, flat panel monitor, CRT), a computer network interface 15 (e.g., network adapter, modem), and a main memory 18 (e.g., RAM). The computer network interface 15 may be coupled to a computer network 19, which in this example includes the Internet.

The computer 10 is a particular machine as programmed with software modules 90. The software modules 90 comprise computer-readable program code stored non-transitory in the main memory 18 for execution by the processor 11. The computer 10 may be configured to perform its functions by executing the software modules 90. The software modules 90 may also comprise computer-readable data. The software modules 90 may be loaded from the data storage device 16 to the main memory 18. The software modules 90 may also be made available in other computer-readable medium including optical disk, flash drive, and other memory devices.

Monitoring and classification of network traffic can be done in-line with the flow of traffic, or off-line via such methods as passively sniffing, attaching to the mirror port of a switch, or replaying traffic previously archived on a device, such as in a Solera Networks Network Forensics™ appliance. Off-line deployments may provide logging and alerting only, may attempt some delayed remediation (such as resetting a TCP connection), or may supply new signatures to other enforcement tools that operate in-line. Embodiments of the present invention may employ either in-line or off-line network traffic monitoring and classification.

Integration with network traffic can occur on local hosts only (such as with a network driver or local firewall), or as a shared gateway used by multiple hosts. On-host deployments may collaborate with other hosts in the network, or may be fully self contained. Depending on integration model, some components of the system may be omitted, such as a management server for coordinating actions across multiple hosts, or a community repository of process information.

Figure 2:
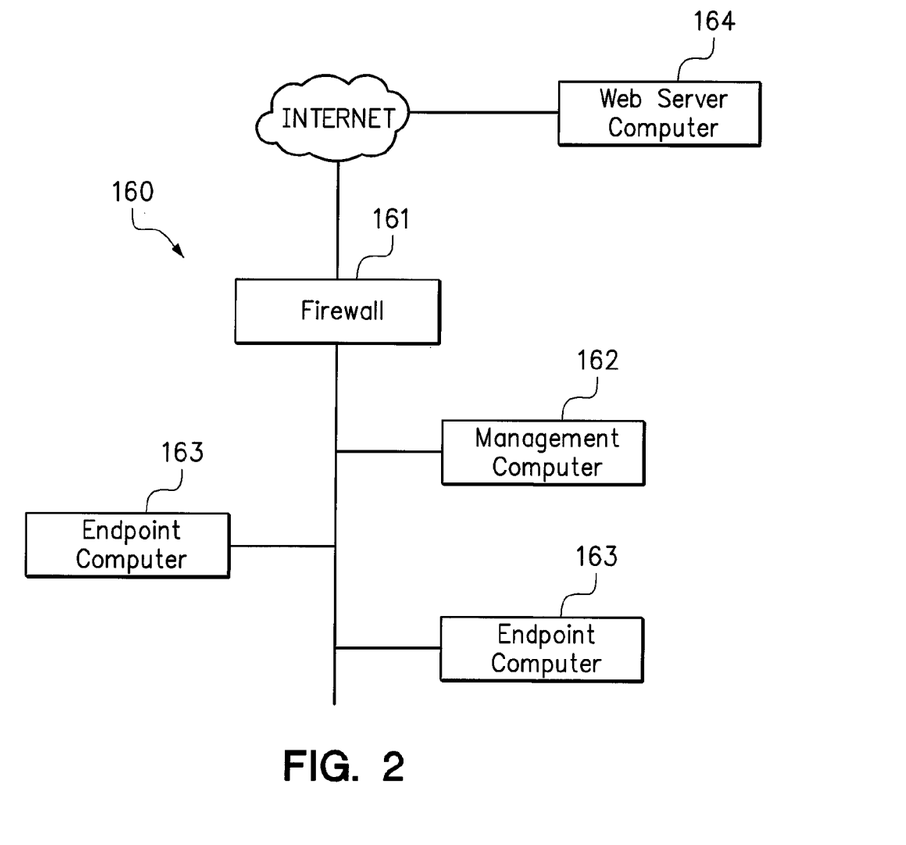
FIG. 2 schematically shows a network application control system in accordance with an embodiment of the present invention.

FIG. 2 schematically shows a network application control system 160 in accordance with an embodiment of the present invention. In the example of FIG. 2, the system 160 includes a firewall computer 161, a management computer 162, and a plurality of endpoint computers 163. The system 160 may provide network application control on a private computer network. In one embodiment, the system 160 is configured to block or allow network traffic, i.e., data communications on the network, based on the type of the network traffic or the local process that generated the network traffic. In marked contrast to conventional network application control approaches, the system 160 is configured to generate a content-based signature for unknown network traffic and provide a recommendation on whether to allow or deny the unknown network traffic. In the example of FIG. 2, the firewall computer 161 may comprise an appliance or server computer serving as a firewall and/or gateway separating the private computer network from other computer networks, such as the Internet. For example, network traffic between an endpoint computer 163 and a web server computer 164 may be monitored and controlled by the firewall 161. Network traffic generated by a process in an endpoint computer 163 may be received and evaluated by the firewall computer 161. The firewall computer 161 may allow or block the network traffic depending on a security policy associated with a signature that matches the network traffic.

Figure 3:
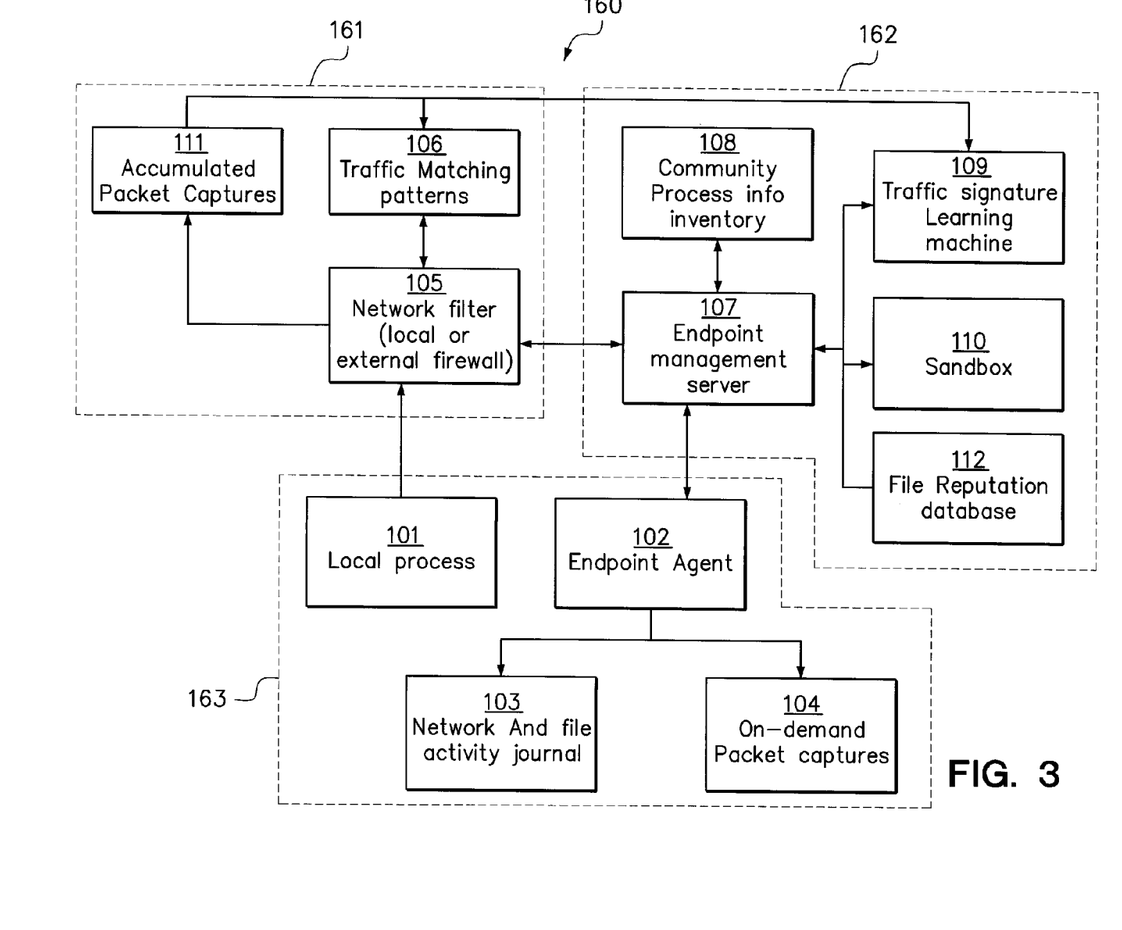
FIG. 3 schematically shows further details of the system of FIG. 2 in accordance with an embodiment of the present invention.

FIG. 3 schematically shows further details of the system 160 in accordance with an embodiment of the present invention. Only one endpoint computer 163 is shown in FIG. 3 for clarity of illustration. In practice, a computer network typically includes a plurality of endpoint computers 163. In the example of FIG. 3, the components of the system 160 may be implemented as software modules.

FIG. 3 shows the components of the system 160 distributed among three different computers 161, 162, and 163 for illustration purposes only. In general, the components of the system 160 may be distributed among one or more computers. For example, as later explained with reference to FIG. 4, the components of a network application control system may be implemented on a single computer in a host-only implementation.

An endpoint computer 163 may comprise a computer running a network-enabled application. A network-enabled application comprises an application program, also simply referred to as an "application," that communicates over a computer network. Examples of network-enabled applications include computer programs for sending/receiving emails, browsing on the Internet, file transfer, social networking, voice over IP, and so on. For example, an email application program may generate network traffic by sending or receiving emails over the network. As another example, a file transfer application program may generate network traffic by receiving a file over the network.

In the example of FIG. 3, the endpoint computer 163 comprises a local process 101, an endpoint agent 102, a network and file activity journal 103, and an on-demand packet captures 104.

The local process 101 may comprise the process of a network-enabled application program running in the endpoint computer 163. In the example of FIG. 3, the local process 101 sends and/or receives unknown network traffic. In other words, the local process 101 sends and/or receives network traffic that is unclassified and thus cannot be identified by the system 160 as being generated by a process of a particular application or a type of application. In one embodiment, network traffic is unknown when it does not have a corresponding signature in the traffic matching patterns 106.

The endpoint agent 102 may be configured to provide an interface for serving commands or queries sent by the endpoint management server 107 and to enumerate executable or loadable files (such as Portable Executable files on Microsoft Windows™ operating system). The endpoint agent 102 may also be configured to provide additional security services, such as scanning for computer viruses.

The network and file activity journal 103 may be configured to maintain a record of all network or file system events performed by any local process, including the local process 101. The journal 103 may be of limited length, so the history of events may extend back for a limited time period, perhaps even only a few seconds. Records in the journal 103 may include a timestamp, the name and digest of the process involved, and the event details. For network activity, the event details may include source and destination IP addresses and port and protocol type. For file activity, the event details may include the name of the file involved and the action type (e.g., open, read, write, etc).

The on-demand packet captures 104 may comprise a local data store that is used to contain full captures of network traffic as requested by the endpoint management server 107.

In the example of FIG. 3, the firewall 161 comprises a network filter 105, traffic matching patterns 106, and accumulated packet captures 111.

The network filter 105 may comprise a local or external firewall. In the example of FIG. 3, the network filter 105 is an external firewall relative to an endpoint computer 163. That is, the network filter 105 is not running on the same computer as the local process 101. In other embodiments, such as that shown in FIG. 4, the network filter is a local firewall in that the network filter and the local process are both running on the same computer. The network filter 105 may be configured to inspect all network traffic passing through it (which in this example includes all network traffic passing through the firewall computer 161), to attempt to classify the network traffic using the traffic matching patterns 106, and to apply appropriate security policy based on the classification or lack of classification of the network traffic.

The traffic matching patterns 106 may comprise a database of signatures used to match network packets or streams. A signature serves as a pattern or template for identifying particular network traffic. An example signature may comprise a regular expression paired with an application type identifier.

Optionally, unknown network traffic detected by the network filter 105 may be stored pending generation of a corresponding signature by the traffic signature learning machine 109. In the example of FIG. 3, these unknown network traffic are stored in a datastore as accumulated packet captures 111. When the network filter 105 is implemented as a process local to an endpoint computer 163, the contents of the accumulated packet captures 111 and on-demand packet captures 104 may be identical.

In the example of FIG. 3, the management computer 162 comprises the endpoint management server 107, a community process information inventory 108, the traffic signature learning machine 109, a sandbox 110, and a file reputation database 112.

The endpoint management server 107 provides command and control of endpoint agents 102, accumulates a network wide picture of installed processes and binaries in the community process information inventory 108, exposes an interface to serve queries from remote security elements, such as the network filter 105, and dispatches tasks to the traffic signature learning machine 109 and the sandbox 110. The endpoint management server 107 is an optional component of a network application control system in that it is not needed in host-only implementations (e.g., see FIG. 4) where coordination of multiple endpoint agents 102 is not needed.

The community process information inventory 108 is another optional component of a network control application system as it is not needed in host-only implementations.

The community process information inventory 108 serves as a repository of information about executable and loadable modules enumerated by endpoint agents 102 of endpoint computers 163 in the network environment. Records in the inventory 108 may include file names, process digests, file digests, digital signatures, and the identity of endpoint agents 102 that enumerated those processes.

In one embodiment, the traffic signature learning machine 109 uses positive samples of unknown network traffic, existing signatures in the traffic matching patterns 106, and negative samples of known network traffic to attempt to deduce a signature that will match unknown network traffic. Positive samples of unknown network traffic may comprise packet captures of one or more transactions known positively to originate from the same application. Typically this would be all the network traffic on the same TCP session, when such traffic is not classified by the existing traffic matching patterns 106. If an endpoint agent is running on the originating computer, the set of positive samples of unknown network traffic may be expanded to include any traffic generated by the same endpoint process that cannot be classified. Alternately, this set may include captures of different instances of unknown network traffic that all exhibit the same statistical characteristics (such as length of payload, byte count frequency, message frequency).

Negative samples of known network traffic may comprise packet captures of traffic known to not belong to the same application protocol as the current unknown traffic under examination. Examples of negative samples of known network traffic may include packet captures of network traffic that can be successfully classified using the traffic matching patterns 106. Negative samples of known network traffic may also include multiple packet captures of unknown network traffic that exhibit different statistical characteristics from the current sample under examination.

The traffic signature learning machine 109 may employ conventional algorithms to generate a signature for matching unknown network traffic, such as that suggested in "Boosting Web Intrusion Detection Systems by Inferring Positive Signatures," by Damiano Bolzoni and Sandro Etalle and "The SPID algorithm—statistical protocol identification", by Erik Hjelmvik. Other algorithms may also be employed without detracting from the merits of the present invention. In situations where the traffic signature learning machine 109 is unable to infer a signature for the unknown network traffic, the results of the inferring attempt may be provided to the computer security vendor to assist in signature generation.

The system 160 may optionally include a sandbox 110 in the management computer 162 for analyzing computer readable program code for presence of malware (e.g., computer virus). In one embodiment, the sandbox 110 provides a controlled environment for executing suspect binary files and compiling a complete analysis of the behavior of those binaries. The sandbox 110 may utilize a local binary analyzer or a remote binary analysis service, such as the Anubis malware analysis service provided by the International Secure Systems Lab of the University of Mannheim.

The system 160 may also optionally include a file reputation database 112 in the management computer 162. The file reputation database 112 may contain information about known files, such as whether a file is a known good (i.e., safe) file or a known malicious file. The file reputation database 112 may also be provided by an off-site service, such as the Trend Micro Global Repository and Information Database (GRID). For example, the endpoint management server 107 may be configured to consult a remote file reputation database to determine a reputation of a particular file.

Figure 4:
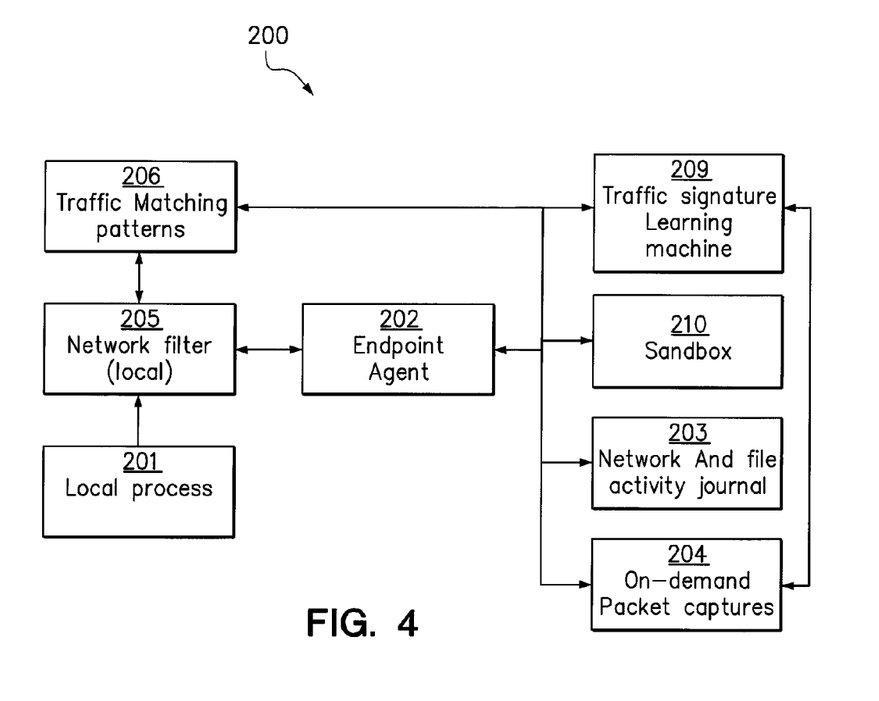
FIG. 4 schematically shows a network application control system in accordance with another embodiment of the present invention.

FIG. 4 schematically shows a network application control system 200 in accordance with an embodiment of the present invention. The system 200 is a host-only implementation of the system 160. The components of the system 200 may be implemented in a single endpoint computer. In the example of FIG. 4, network application control functionality is local to the local process. The computer 200 may comprise a local process 201, an endpoint agent 202, a network and file activity journal 203, on-demanp packet captures 204, a local network filter 205, traffic matching patterns 206, a traffic signature learning machine 209, and a sandbox 210. In a host-only implementation, the network filter can communicate with the endpoint agent directly, and doesn't necessarily have access to other hosts' data captures or process information. The functionality of components not included in the host-only implementation, e.g., reporting and coordination with the traffic signature learning machine functions of the endpoint management server, may be delegated to other components in a host-only implementation. The components of the computer 200 are otherwise the same as their counterparts in the system 160.

Figure 5:
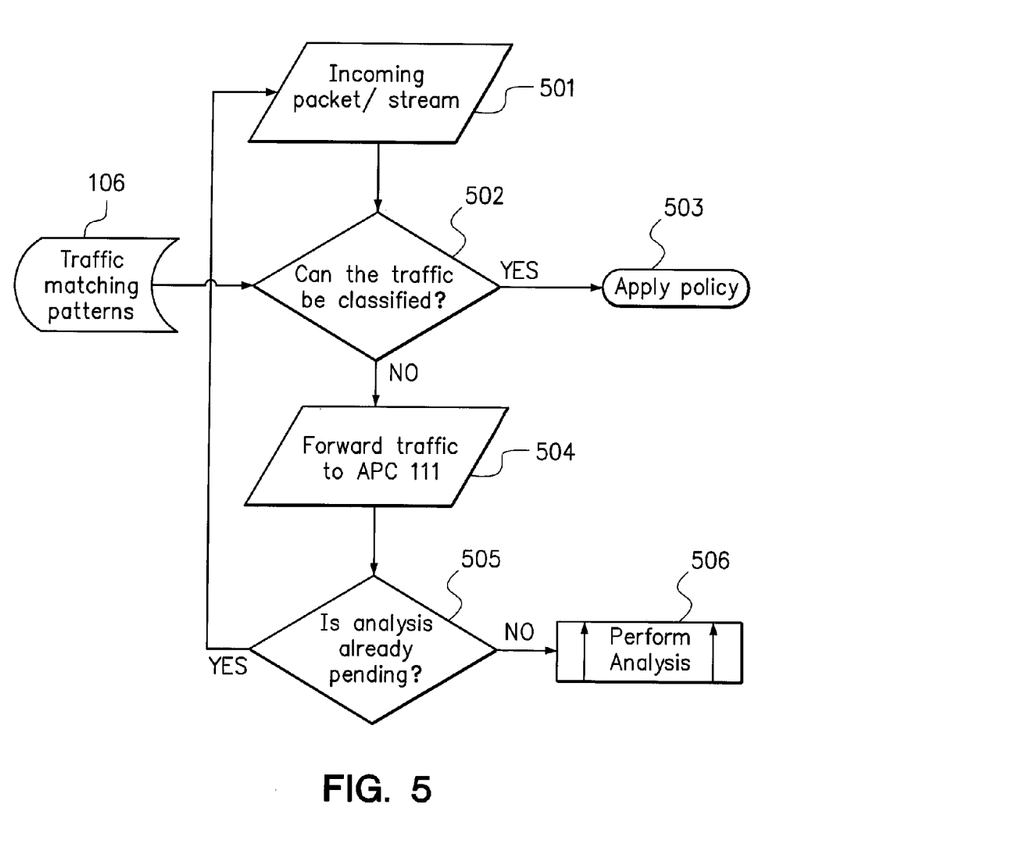
FIGS. 5-9 show flow diagrams of methods of classifying unknown computer network traffic in a computer network in accordance with an embodiment of the present invention.

FIG. 5 shows a flow diagram of a method of classifying unknown computer network traffic in accordance with an embodiment of the present invention. For illustration purposes, the method of FIG. 5 is explained as performed by the network filter 105 of the system 160 (FIG. 3) to filter network traffic.

The network filter 105 receives network traffic as incoming packet stream (501). If the packet's stream or virtual session has not yet been identified, the network filter 105 attempts to classify the packet by matching the packet against signatures in the traffic matching patterns 106 (502). If a match is found, then a policy verdict can be rendered immediately (503). A policy verdict may be configurable by the network administrator depending on the network traffic. For example, the policy verdict may be to allow network traffic generated by a particular local process. When the packet matches a signature indicating that the packet was generated by the particular local process, the network filter 105 allows the packet stream to pass per the policy verdict. Of course, the policy verdict may also be configured to block network traffic of certain local processes.

When the packet received by the network filter does not match a signature in the traffic matching patterns 106 but a match may be possible with additional data (e.g., there is a partial match with a signature that requires multiple packets to be accurate), then the packet is allowed to pass and a policy verdict is delayed. In that case, a copy of the current packet may be temporarily stored to facilitate either future matching or submission for automated analysis. If no match is possible given the current signature set, the packet and its associated stream or virtual session are considered unknown network traffic. In other words, the network traffic is unknown because it cannot be classified by the system. In that case, the current packet and any buffered packets from the same session are submitted to the accumulated packet captures 111 (504). If this session has already been submitted for analysis, then no further action is taken by the network filter 105. Otherwise, if the session has not yet been submitted for analysis, then a request is dispatched to the endpoint management server 107 to gather additional information and start the analysis (506).

Figure 6:
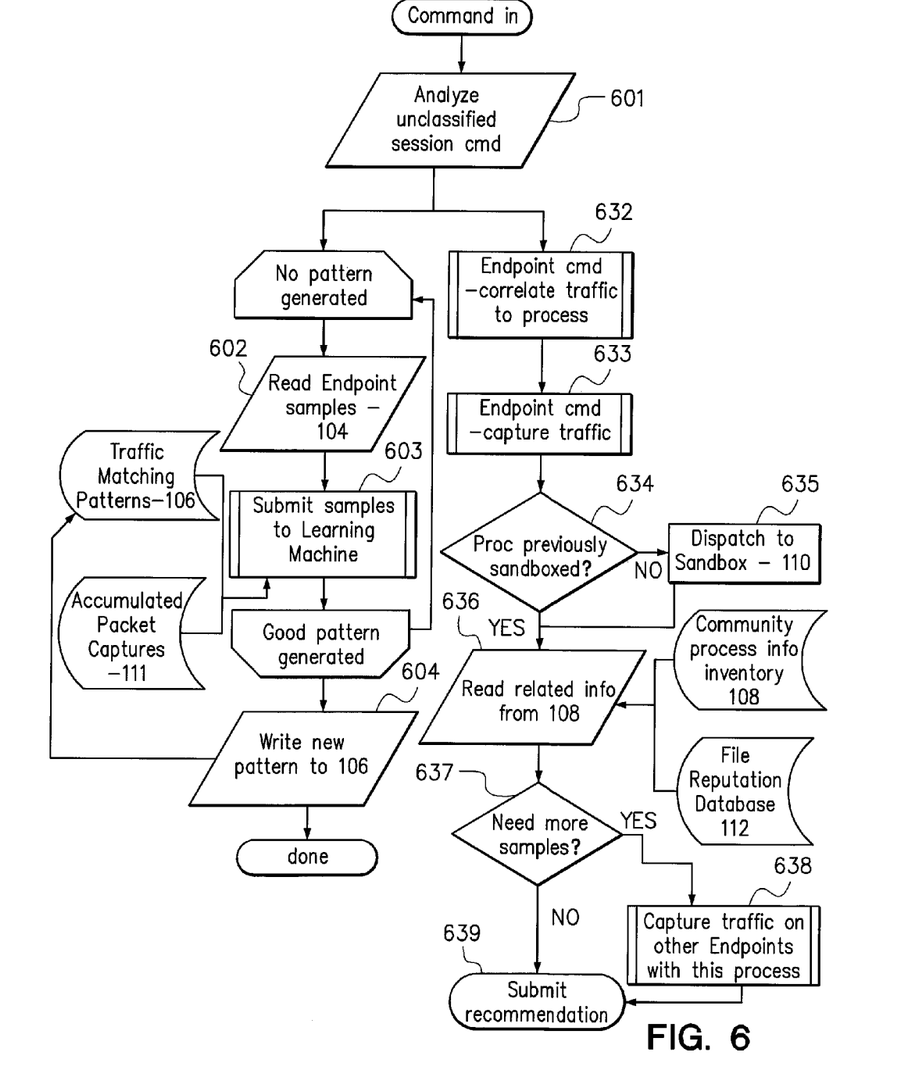

FIG. 6 shows a flow diagram of a method of classifying unknown computer network traffic in accordance with an embodiment of the present invention. The method of FIG. 6 is explained below as an example of coordinated analysis of unknown network traffic performed by the endpoint management server 107 (FIG. 3) using information received from endpoint agents 102 running in different endpoint computers 163.

Upon receipt of an analysis request from the network filter 105, the endpoint management server 107 attempts to collect more information about the local process 101 responsible for the unknown network traffic and starts analysis of the unknown network traffic (601). The unknown network traffic does not have any corresponding signature, i.e., pattern, in the traffic matching patterns 106 at this point of the analysis. Additional information about the local process 101 that generated the unknown network traffic may be read from the on-demand packet captures 104 of the endpoint computer 163 (602) and the accumulated packet captures 111 of the firewall computer 161. Currently available samples of the unknown network traffic, including samples collected by the network filter 105 stored in the accumulated packet captures 111 and samples collected by individual endpoint agents 105 stored in the on-demand packet captures 104, are submitted to the signature learning machine 109 (603), which generates a matching signature for the unknown network traffic using information from the samples and signatures in the traffic matching pattern 106. Several iterations of this step may be required, with each iteration providing a greater number of samples. The signature generated by the traffic signature learning machine 109 is stored in the traffic matching patterns 106 (604).

In the example of FIG. 6, the endpoint management server 107 also dispatches a command to the endpoint agent 102 residing on the endpoint computer 163 that sent the unknown network traffic in order to determine the name and digest of the local process 101 responsible for the unknown network traffic (632). If no matching signature for the unknown network traffic has yet been generated, the endpoint agent 102 is also instructed to capture future traffic from that local process into the on-demand packet captures 104 repository (633). The endpoint management server 107 checks whether or not the local process 101 has been previously analyzed for malicious code in a sandbox 110 (634). If the local process 101 has not been previously analyzed for malicious code in the sandbox 110, the local process 101 is dispatched to the sandbox 110 to gather more information about the process' behavior (635). The analysis report from the sandbox 110 will be retained for use in guiding the automated policy recommendation as well as for possible submission to a human analyst. The endpoint management server 107 may also access any other information about the local process 101, including information available from the community process information inventory 108 and file reputation database 112, to help in rendering an automated policy recommendation (636). Factors that may be considered in rendering the policy recommendation may include whether the local process 101 is digitally signed by a trusted vendor, whether the local process 101 is installed on many endpoint computers in the network, and whether the local process 101 or file digest for this instance differs from other installed instances.

If the traffic signature learning machine 109 cannot yet infer a signature for the unknown network traffic generated by the local process 101 (637), the endpoint management server 107 may instruct other endpoint computers 163 that host the same local process 101 to start capturing all network traffic from that process to increase the pool of positive samples available to the learning machine 109 (638). At the completion of analysis, the endpoint management server 107 prepares a report for the network administrator including the Identifier that the new signatures will return when matching traffic, a detailed report on the local process 101 responsible for the traffic (e.g., name, digest, local install count, digital signature if any, sandbox report), and an initial recommendation for policy (639). The recommended policy may indicate whether to block or allow network traffic generated by the local process 101. As can be appreciated, instead of having a general policy of blocking or allowing all unknown network traffic, embodiments of the present invention allow unknown network traffic from particular processes to be allowed or blocked depending on the results of the analysis before an official signature for detecting the traffic is received from the vendor of the network application control system.

Figure 7:
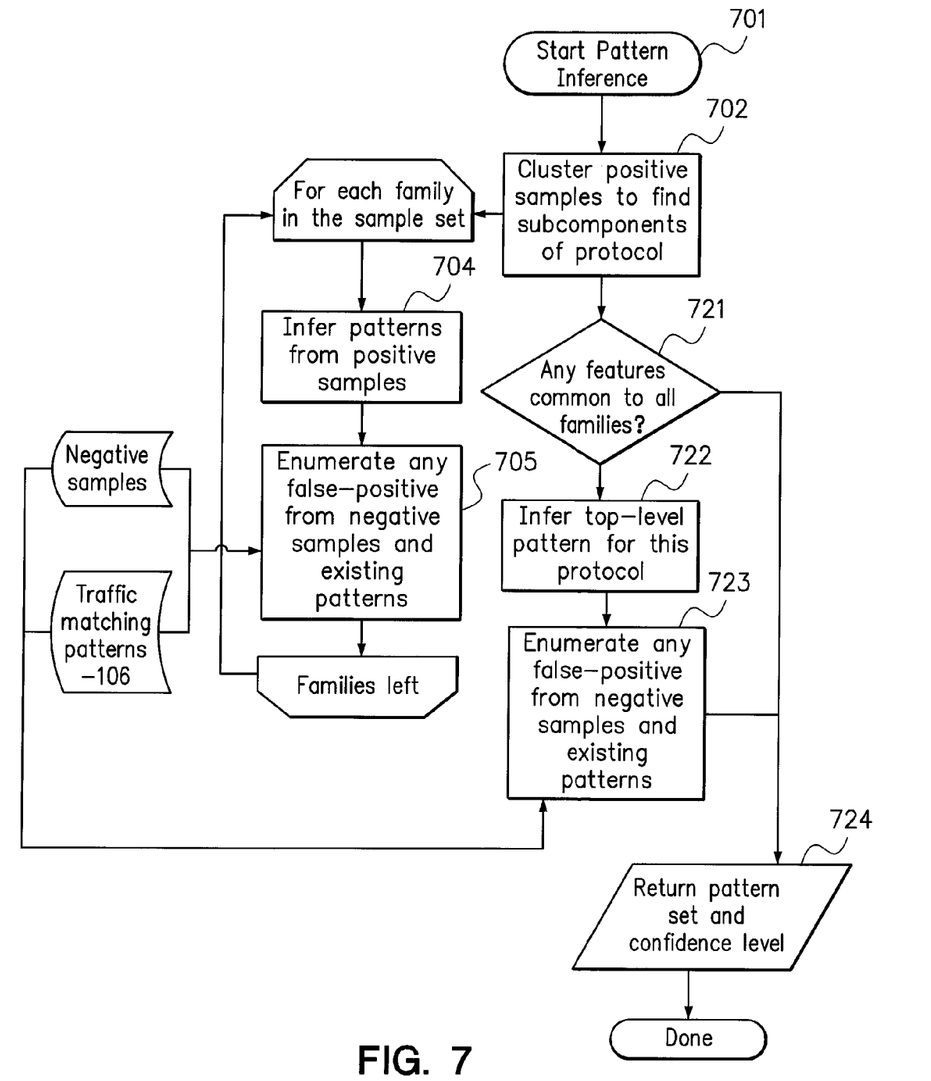

FIG. 7 shows a flow diagram of a method of classifying unknown computer network traffic in accordance with an embodiment of the present invention. In one embodiment, the method of FIG. 7 is performed by the traffic signature learning machine 109 to generate a signature for unknown network traffic.

After receiving the initial sample set and command to begin inferring a signature (701), the traffic signature learning machine 109 may attempt cluster analysis (702) to determine if the samples share a common feature set (721), and if there are distinct groups of sessions within the whole sample set that may indicate different commands within the unknown protocol of the traffic (702 to 703). For each distinct cluster identified (in 702), a signature that can match that cluster is inferred (704) and verified against the negative samples and existing pattern set (705). The learning machine 109 also attempts to infer a suitable signature for pattern matching the common features of the overall sample set and/or any subgroups within the set (722). A similar approach is performed in the field of intrusion detection, e.g., see "Boosting Web Intrusion Detection Systems by Inferring Positive Signatures," by Damiano Bolzoni and Sandro Etalle. If such signatures can be determined from the currently available data, the signatures are compared against a corpus of samples from known patterns as well as the existing traffic matching patterns 106 to check for conflicts with existing signatures (723).

If an algorithm for pattern inference from both positive and negative samples is employed, the result of the verification step (723/705) may be directly integrated into the inference step.

Signatures and corresponding confidence level (e.g., derived from the size of the current sample set and any conflict with existing signatures) generated by the traffic signature learning machine 109 are returned to the endpoint management server 107 (724). If the confidence level surpasses a configurable threshold, the generated signatures may be added to the traffic matching patterns 106 until an official signature is released by the vendor of the network application control system. The recommended security policy for the network traffic may be applied to subsequently received network traffic matching the generated signature.

Figure 8:
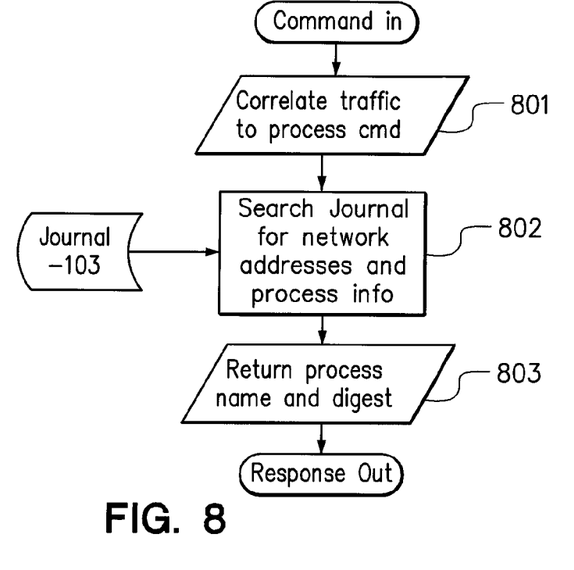

FIG. 8 shows a flow diagram of a method of classifying unknown computer network traffic in accordance with an embodiment of the present invention. In one embodiment, the method of FIG. 8 is performed by an endpoint agent 102 to identify the process that generated the unknown network traffic.

As part of its normal functions, an endpoint agent 102 regularly enumerates executable and loadable modules (e.g., portable executable files on endpoint computers running the Microsoft Windows™ operating system) present on the endpoint computer 163. A complete inventory of binary files and their digests may be transmitted by the endpoint agent 102 to the endpoint management server 107 for storage in the community process information inventory 108. The endpoint agent 102 may interoperate with a kernel module to receive notification of all file system and network events on or detected by the endpoint computer 163. Such events and the associated process ID, process name, and digest may be recorded along with the timestamp of the event in the local network and file activity journal 103.

In one embodiment, the endpoint agent 102 handles requests from the endpoint management server 107 to identify the local process responsible for network activity either from or to the endpoint computer 163. The endpoint management server 107 may provide the time of the event and all related addressing information and protocol (e.g., UDP/TCP), which the endpoint agent 102 uses to correlate the network traffic to a particular local process 101 running in the endpoint computer 163 (801). The endpoint agent 102 may search the network and file activity journal 103 to identify the process that performed the network activity (802), and if found will return to the endpoint management server 107 the name and digest of the local process responsible for the network traffic (803).

Figure 9:
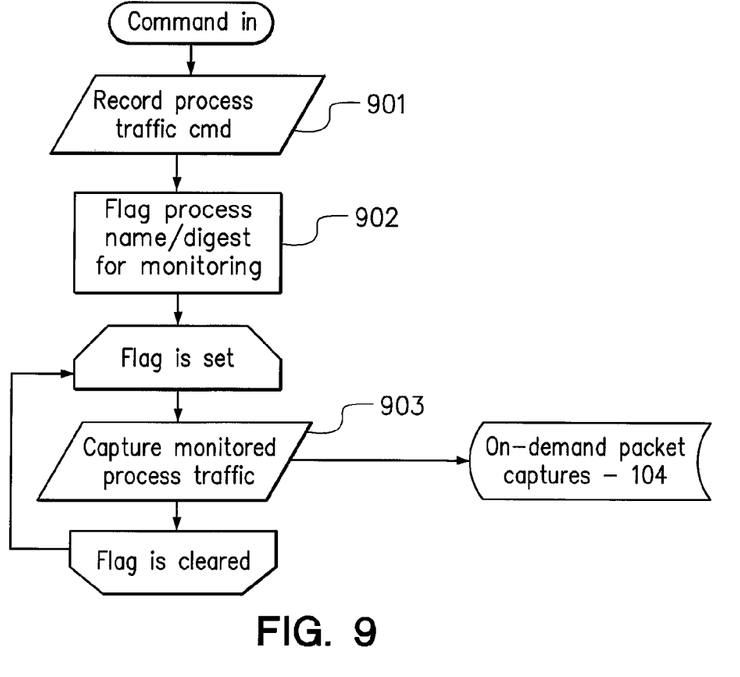

FIG. 9 shows a flow diagram of a method of classifying unknown computer network traffic in accordance with an embodiment of the present invention. In one embodiment, the method of FIG. 9 is performed by an endpoint agent 102 to monitor a particular local process. The endpoint agent 102 receives a command from the endpoint management server 107 to monitor specific processes for network activity (901). The endpoint agent 102 flags those processes for monitoring (902) and captures the packets generated or received by the monitored processes (903). The endpoint agent 102 stores the captured packets locally in the on-demand packet captures 104. The endpoint agent 102 may retrieve the contents of the on-demand packet captures 104 for transmission to the endpoint management server 107.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of classifying unknown network traffic in a computer network, the method comprising:
   receiving a first set of network traffic generated by a local process running in an endpoint computer in a computer network;
   detecting that the first set of network traffic is an unknown network traffic that has no corresponding signature in a database of traffic matching patterns for identifying network traffic; and
   in response to detecting that the first set of network traffic is an unknown network traffic; generating a signature for the first set of network traffic; analyzing the first set of network traffic; generating a policy recommendation for the first set of network traffic based on the analysis of the first set of network traffic, the policy recommendation indicating whether to allow or block the network traffic; receiving information from the endpoint computer identifying the local process as having generated the first set of network traffic; and updating the database of traffic matching patterns to include the signature generated for the first set of network traffic.

2. The method of claim 1 further comprising:
   receiving a second set of network traffic;
   detecting that the second set of network traffic matches the signature generated for the first set of network traffic and that the local process generated the second set of network traffic; and
   applying the policy recommendation for the first set of network traffic to the second set of network traffic.

3. The method of claim 1 wherein analyzing the first set of network traffic comprises:
   commanding an endpoint agent running in the endpoint computer to identify the local process in the endpoint computer; and
   receiving information about the local process from the endpoint computer over the computer network.

4. The method of claim 3 further comprising:
   in response to detecting that the first set of network traffic is an unknown network traffic, commanding the endpoint agent to capture network traffic subsequently generated by the local process.

5. The method of claim 1 wherein analyzing the first set of network traffic comprises:
   analyzing the first set of network traffic for malicious codes.

6. The method of claim 1 further comprising:
   retrieving information about executable modules enumerated by a plurality of endpoint agents running in endpoint computers in the computer network.

7. The method of claim 1 wherein analyzing the first set of network traffic comprises accessing information from a file reputation database.

8. The method of claim 1 wherein analyzing the first set of network traffic comprises determining whether the local process that generated the first set of network traffic is digitally signed by a trusted vendor.

9. A network application control system in a computer network, the system comprising:

a plurality of endpoint computers running a plurality of processes;

a firewall computer configured to filter network traffic generated by the plurality of endpoint computers in the computer network, the firewall computer being configured to receive and detect a first set of network traffic that is not classified to be generated by a particular process running in an endpoint computer in the plurality of endpoint computers; and a management computer configured to receive the first set of network traffic from the firewall computer for analysis, the management computer being configured to receive information from the endpoint computer identifying the particular process that generated the first set of network traffic, to generate a signature for pattern matching the first set of network traffic and a policy recommendation on whether to allow or block other network traffic that matches the signature for pattern matching the first set of network traffic.

10. The system of claim 9 wherein the plurality of endpoint computers is configured to provide information about the plurality of local processes to the management computer.

11. The system of claim 9 wherein the management computer is configured to write the signature for pattern matching the first set of network traffic to a datastore of traffic matching patterns.

12. The system of claim 11 wherein the firewall computer is configured to detect that a second set of network traffic matches the signature for pattern matching the first set of network traffic and to apply the policy recommendation to the second set of network traffic.

13. A method of classifying unknown network traffic in a computer network, the method comprising:

detecting that a first set of network traffic transmitted over a computer network is unknown network traffic with no corresponding signature;

generating a signature for the first set of network traffic;

receiving information from an endpoint computer running a local process, the information identifying the local process as having generated the first set of network traffic;

analyzing the first set of network traffic; and generating a policy recommendation for the first set of network traffic based on the analysis of the first set of network traffic.

14. The method of claim 13 further comprising:

receiving a second set of network traffic;

detecting that the second set of network traffic matches the signature generated for the first set of network traffic; and applying the policy recommendation for the first set of network traffic to the second set of network traffic.

15. The method of claim 13 wherein analyzing the first set of network traffic comprises:

commanding an endpoint agent running in the endpoint computer to identify the local process in the endpoint computer; and receiving information about the local process from the endpoint computer over the computer network.

16. The method of claim 15 further comprising:

commanding the endpoint agent to capture network traffic subsequently generated by the local process.

17. The method of claim 13 further comprising:

updating a traffic matching patterns database to include the signature for the first set of network traffic.

18. The method of claim 13 wherein analyzing the first set of network traffic comprises:

analyzing the first set of network traffic for malicious codes.

19. The method of claim 13 further comprising:

retrieving information about executable modules enumerated by a plurality of endpoint agents running in endpoint computers in the computer network.

20. The method of claim 13 wherein analyzing the first set of network traffic comprises determining whether the local process is installed on more than one endpoint computer in the computer network.

* * * * *